(12) United States Patent
Polak et al.

(10) Patent No.: US 7,824,570 B2
(45) Date of Patent: Nov. 2, 2010

(54) FLOCCULATING AGENT METHOD FOR THE PRODUCTION AND USE THEREOF

(75) Inventors: Walter Polak, Salzburg (AT); Herbert Schwaiger, Ebensee (AT)

(73) Assignee: P & W Invest Vermogensverwaltungsgessellschaft MNH, Salzburg (AT)

( * ) Notice: Subject to any disclaimer, the term of this patent is extended or adjusted under 35 U.S.C. 154(b) by 898 days.

(21) Appl. No.: 10/566,638

(22) PCT Filed: Jul. 27, 2004

(86) PCT No.: PCT/EP2004/008400

§ 371 (c)(1),
(2), (4) Date: Feb. 16, 2007

(87) PCT Pub. No.: WO2005/011837

PCT Pub. Date: Feb. 10, 2005

(65) Prior Publication Data

US 2008/0099405 A1     May 1, 2008

(30) Foreign Application Priority Data

Jul. 29, 2003    (DE) ................................ 103 34 521

(51) Int. Cl.
*C02F 1/52*      (2006.01)
(52) U.S. Cl. ...................... 252/175; 210/716; 423/122; 423/184
(58) Field of Classification Search .................. 252/175
See application file for complete search history.

(56) References Cited

U.S. PATENT DOCUMENTS

| | | | |
|---|---|---|---|
| 2,241,641 A | | 5/1941 | Magill |
| 4,035,259 A | * | 7/1977 | Casale ........................ 252/175 |
| 4,402,850 A | | 9/1983 | Schorghuber |
| 4,486,314 A | * | 12/1984 | Koppelmann et al. ....... 210/714 |

FOREIGN PATENT DOCUMENTS

| | | |
|---|---|---|
| DE | 29 36 214 A1 | 3/1981 |
| DE | 293 100 A5 | 8/1991 |
| DE | 38 76 792 T2 | 6/1993 |
| EP | 0 070 365 B1 | 7/1985 |
| GB | 618 895 A | 3/1949 |

OTHER PUBLICATIONS

Chinese Examination Report dated Jun. 29, 2007.
International Search Report.
German Examination Report.
Written Opinion translation.

* cited by examiner

*Primary Examiner*—Peter A Hruskoci
(74) *Attorney, Agent, or Firm*—Fay Sharpe LLP

(57) ABSTRACT

Disclosed is an alkali aqueous flocculating agent based on an alkali aqueous salt clay extract containing dissolved silicate and aluminate, in addition to alkali chloride whereby for an aluminate (1) content by weight expressed as $Al(OH)_3$, 1.) approximately 2 to 3 parts by weight of silicate expressed as $SiO_2$ are provided and 2) at least approximately (10) parts by weight, especially at least (20) parts by weight of alkali chloride are provided, in addition to a flocculating and a sedimentation agent in the form of an acidic and alkali-extracted salt clay. The invention further relates to a method for the production of said flocculating and sedimentation agents which can be used advantageously in swimming baths, for the treatment of drinking water, industrial water, grey water and waste water in sewage treatment plants as auxiliary agents for absorption, sedimentation and filtration. Said agents can also be used to reduce the amount of harmful substances and to embellish water in swimming pools, ponds and biotopes. The respective flocculating agent is more particularly used by means of dosing systems. One particular advantage of the invention is that the agent is obtained from a natural product and can be used in swimming pools and water biotopes without any harmful side effects.

18 Claims, No Drawings

//FLOCCULATING AGENT METHOD FOR THE PRODUCTION AND USE THEREOF

The invention concerns an alkali aqueous flocculating agent, a flocculating- and sedimentation agent in the form of an acidic—and alkali-extracted salt clay, a method for the production of these flocculating agents, as well as special fields of application for the flocculating agents.

In addition to "artificially" constructed swimming—and bathing pools for public as well as private use, the so-called "artificially" constructed swimming—and bathing ponds, including "biotopes" are enjoying ever growing popularity. The biggest problem of these artificially constructed ponds and biotopes lies in the fact that over time there is a change in the appearance of the water. This may even occur after a period of several years. When the ecological system is in balance, the water is mostly clear and clean. As a rule, pond 'aficionados" are unaware of the ecological, chemical, biological and/or micro-biological processes and relationships, so that many times there is the erroneous belief that an artificially arranged pond is fully comparable to a natural body of water. Practical observations and ample testing have provided proof that a natural ecological system cannot be transferred 1:1 to an artificially constructed pond. The main set of problems is the "remobilization and revitalization process" of organic and inorganic substances, which takes place in small bathing ponds due to the water being so shallow. Natural bodies of water usually have greater depth and, as a result, the revitalization of the named substances is not as rapid—these are deposited in greater depth as biomass and sedimentation. Irrespective of clear, esthetic water having ample "viewing depth", attention must definitely be paid to the hygienic conditions as well. Since, as a rule, in a bathing pond compared with a natural body of water or sea, water volume and/or water quantity provided for a single bather is significantly smaller—many times the addition of fresh water is also too low—micro-biological problems can never be fully excluded.

In comparison to an artificially constructed open air swimming pool, where one can control the quality of the water with high precision and within known parameters by addition of flocculating, filtering and disinfecting agents, so that the water in the swimming pool will not present any risk of infection for the visitor—such, however is not the case with an artificially constructed swimming pond. Here it will, over the long term, only be possible and sensible to assist in the caring and maintenance of the water with the aid of technical facilities—in the concrete instance, the "bio-cycle". Inasmuch as classical oxidative water disinfectants, which are employed in swimming pools, such as for example chlorine or chlorine/chlorine-dioxide and other known disinfectants for water, cannot be given consideration in this case, one should at least undertake a flocculating filtration and/or explore the possibility of disposing of the sedimentation and deposits arranged on the ground by means of suction removal.

It is therefore the object of the invention to propose a means which can specifically be utilized as flocculating and flocculation agents for the flocculating stage in a swimming pool cycle, and which possess properties—without affecting fauna and flora—no damage to the living community of plants and animals)—which renders it suitable for the treatment of water in an artificially constructed swimming—or bathing pool—and to achieve this as a means for flocculent filtration having flocculating and precipitating properties as well as a sedimentation means. Since the organic and inorganic flocculating agents and flocculating auxiliary agents on the market do not lend themselves for a broad-based application because of their properties and unwelcome reaction products, etc., it was the object of the invention to provide a substance which can be employed, without restriction and without causing any problem or danger, in the swimming and bathing pool water of artificially constructed swimming pool facilities, including in open-air facilities, such as swimming ponds and biotopes. Furthermore, it is the object of the invention to develop a means made of a natural product which can be utilized without detrimental side effects in bathing ponds and water-biotopes.

The invention comprises first an alkali aqueous flocculating means based on an alkali aqueous salt clay extract having a contents of dissolved silicates and aluminates and of alkali-chloride, whereby for one part by weight of aluminates (expressed as $Al(OH)_3$) are provided approximately 2 to 3 parts by weight of silicate (expressed as $SiO_2$), as well as 2.) at least 10 parts by weight, especially at least 20 parts by weight of alkali-chloride. Said flocculent is identified hereinafter as "alkali aqueous flocculating agent (A)" in order to aid in the differentiation.

Moreover, the invention concerns a solid flocculating and sedimentation agent in form of an acidic and alkali salt clay extract, preferably in extremely fine distributed form. Said flocculating and sedimentation agent is hereinafter (to differentiate it from flocculating agent A) identified as flocculating and sedimentation agent (B).

The two afore-named flocculating agents (A) and (B) present the following beneficial formats: The alkali aqueous flocculating agent (A) is specifically characterized in that the alkali-chlorides are present in the form of sodium-chloride and/or potassium chloride. It is particularly preferred if for one part by weight of aluminate there is provided at least approximately 30 parts by weight, in particular approximately 40 to 60 parts by weight of alkali-chloride. The named lower beneficial limit of approximately 30 parts by weight means that for the formation of stable, easily filterable particle clusters and excellent purification, alkali-chlorides make significant contribution, with the reservation, however, that an upper and lower limit value should not be surpassed.

Especially beneficial results are established in the range of approximately 40 to 60 parts by weight of alkali-chloride, said results proving themselves in that the load of the colloidal water-contained impurities are being affected in such manner that these micro-particles cluster together to larger agglomerates and they can thus be more readily deposited and/or filtered.

The alkali aqueous flocculating agent (A) is particularly characterized in that its pH-value lies above 9, in particular above 11. In this context, the following should be pointed out:

The solubility of the silicic acid and also that of the aluminate depends upon the alkalinity and/or the pH-value, so that it is of advantage to establish a pH-value in the product which lies above 11. When dosing the flocculating agent into the water which is to be treated, there occurs a rapid drop in the pH-value to less than 9 and, as a result, the desired spontaneous reaction and clustering of the silicic acid and aluminate take place, which, in turn, leads to the required agglomeration of the colloidal water impurities.

Maintenance of the particularly preferred pH-value range of approximately 12 to 14 results in a particularly beneficial solution of the underlying object.

In principle, the invention is not subject to any significant restriction with respect to utilization of the salt clay that is to be extracted. For production of the flocculating agents one may employ gray, green, red and/or black salt clay, with preference to be given to the green salt clay, since it is easier disintegrated. These starter materials will be discussed in detail later on. The particular advantage of the invention-specific flocculating agent (A) is especially to be regarded in that it generally involves a clear, colorless, odorless and non-toxic solution.

The flocculating and sedimentation agent (B) which contains solid matter in form of suspended clay particles, which is likewise manufactured by an alkali- and acidic extraction of salt clay, presents particular benefits when the average particle size of the solid materials is smaller than 50 µm, especially smaller than 20 µm. If these values drop even lower, it means that the specific surface of the clay particles is very large, thus reinforcing the flocculating effect and the sedimentation behavior of the water impurities is subjected to a positive influence.

It is particularly preferred if the average particle size is smaller than 10 µm, and especially if 30% of the particles have a particle size of less than 3 µm. This has a particularly positive influence upon the flocculating- and purification performance.

The invention-specific flocculating and sedimentation agent (B) preferably originates also from gray salt clay, green salt clay, red salt clay and/or black salt clay, especially from green salt clay.

The invention, which is presented by means of two specific flocculating agents, is going to be explained in more detail as follows:

Many observations have shown that waters and/or salt solutions, which are treated with 'Werkslaist' (=salt clay) or which were in contact with same, presented, following sedimentation of the salt clay, an extraordinary brilliant clarity. These observations led to the deliberation to develop a product from "Werkslaist" suitable for the treatment of water in swimming pools and/or improvement of water quality in bathing ponds. "Werkslaist" is a by-product in the Alpine Salt-Mining Industry which occurs when crude brine is produced. In other words, the "Werkslaist" originates from hazel agglomerate. That is a specific type of stone formation within the Alpine salt deposit site. The Alpine salt deposits contain only little massive rock salt, but a predominant amount of hazel agglomerate. This is a mixture of stone which developed as a result of mountain range movement. It contains in a basic mass small-grained to granular mineral salts, mainly salt clay, but also different phenocrysts, such as anhydrite, polyhalite, muracite, sandstone and a number of other minerals. As a result of the tectonic folding pressure, the narrow salt-, clay- and anhydrite deposits are crushed and flow-tectonically mixed to hazel agglomerate. The mineral salt contents in the hazel agglomerate lies between 10 and 70%. In order to produce brine and salt, one must employ the "wet exploitation method". In the troughs and drill hole shafts, the brine becomes enriched with sodium-chloride (25-26%) while the insoluble parts sink to the ground as "Werkslaist". Salt clays are a group of clay minerals which developed due to intensive exchange of matter between the "impurities" and the salt agglomeration. This can be recognized from the authenticable geological new-formation of quartz, potassium feldspar, gypsum and clay minerals of the chlorite group. An X-ray check of the salt clays produced pelitic mica clay, with principal components of illite, chlorite, muscovite, vermiculite and, caused by the formation in salt water, mixed layer minerals of most diverse composition. Combinations frequently occur such as chlorite/montmorrillonite, illite/chlorite. Illites and muscovite constitute a main component of the salt clays. The unique geo-chemical position of the salt clays is based on their relatively high MgO-contents and the predominance of the magnesium-silicates. Many minerals can be found in the salt deposit sites of the Eastern Alps. A distinction is made between chemical precipitation agglomerates (mineral salt and accompanying salts) clastic accompanying agglomerates (clay and sandstones) semisalinary minerals and trace elements (glauberite, vanthoffite, astrakanite, simonyte, loeweit, glaserite, langbeinite, leonite, schoenite, polyhalite and others). Depending upon the predominant clay component, several hazel agglomerates can be distinguished, namely black, green, gray or colored (red) hazel agglomerate, and/or mixtures of these main categories. One finds, however, also anhydrite hazel agglomerate. In this instance the basic mass of mineral salt is replaced by anhydrite or gypsum.

In the following, a description is given of the formation processes in connection with the different agglomerates from the named salt clay types: The red salt agglomerate is the result of a quiet, rarely interrupted sedimentation in deeper recessed troughs, without constant inflow of fresh water. The green clay agglomerate developed in regions near the coast line and contains no enclosures of anhydrite and polyhalite. The gray salt agglomerate developed under reducing conditions as salinary edge- and threshold facies; it contains anhydrite debris and is interspersed with huge fetid dolomite anhydrite banks. The colored salt clay agglomerate contains all clastic and sulfatic components of the remaining salt agglomeration types and developed by sedimentation of re-dissolved salt agglomerate. By detection of the rich spore traces in the salt agglomerate it is possible to provide more precise details with respect to the development of the alpine salt deposits. Accordingly, the salt deposit sites were formed during the Oberperm (Zechstein) period and the Oberskyth period. In the Oberperm phase the red salt and green salt agglomerate was formed; in the Oberskyth period the gray salt agglomerate was formed.

Further details with respect to the addressed salt clay types are provided below:

Gray salt clay: fresh dark gray, pit-wet light gray, thin-leafed, soft. Soapy feel on contact, gives off white color and delivers difficult to penetrate 'Laist'. Rare in pure form, mostly in transitional form to green clay. Occurs in: Hall/Tirol, Hallein, Hallstatt. Green salt clay: when freshly mined dark gray, pit-wet gray/green with rust-yellow coating on the separation surfaces, very dense, hard, breaks off in flat shell shapes, at times sandy. Delivers moderately difficult to penetrate "Laist". Occurs in: Hall/Tirol, Hallein and Hallstatt, not in Bad Ishl and Altaussee. Red salt clay: reddish-brown to purplish-brown, otherwise more like green or black salt clay. This type of clay is indistinguishable on the outside from pieces which are partially or completely discolored due to oxidation. Occurs in: Hall/Tirol—very rarely in the remaining salt mines as secondary deposits. Black salt clay: fresh dark gray, pit-wet black, bleaching in daylight, in dry air often efflorescent (hair salt). Thin-layered or in ribbon form, breaking off in flat or angular pieces, softer than green salt clay. Frequently in combination with and/or in transition to gray anhydrite (anhydritic black salt clay). Delivers easily permeable "Laist". Occurs in: Altaussee and Ischl, in second place in Hallstatt and Hallein; in Hall plays only secondary role.

The median chemical compositions of the discussed alpine salt clay types (main components) are evident from the Table which follows:

|  |  | Black | Green Salt Clay | Gray | Red |
|---|---|---|---|---|---|
| Specific Weight |  | 2.74 | 2.78 | 2.81 | 2.74 |
| $SiO_2$ | [%] | 44.82 | 51.00 | 52.30 | 49.05 |

-continued

|  |  | Black | Green Salt Clay | Gray | Red |
|---|---|---|---|---|---|
| $Al_2O_3$ | [%] | 17.78 | 21.20 | 21.10 | 21.15 |
| $MgO + CaO$ | [%] | 14.07 | 9.90 | 10.31 | 9.14 |
| $K_2 + Na_2O$ | [%] | 4.72 | 4.07 | 4.16 | 4.65 |
| $Fe_2O_3 + FeO$ | [%] | 6.46 | 7.00 | 5.66 | 11.20 |

In the chemistry of the salt clays there are no significant differences. The gray salt clay has a higher content of silicic acid and alumina and the red salt clay has a higher content of iron compounds (hematite only occurs in red salt clay). X-ray-diffractometric examinations indicated primarily the following minerals: clay minerals: illite/muscovite 70-9%, chlorite 5-25%, montmorillonite and others 2-6% (other minerals: halite, quartz, feldspat, magnesite, anhydrite). Three-layer minerals, such as illite, montmorrillonite, chlorite and vermiculite have basically the same construction. With insertion of ion potassium as intermediary layer, illite is created. When Ca, Mg, Na is embedded, montmorrillonite and vermiculite develops.

The leached hazel agglomerate is called "Laist". The "Laist" from gray and green salt clay is water impermeable and can adsorb a lot of water. The distribution and structure of illite and chlorite and the grain size distribution play a significant role. The percentage of particles smaller than 2 µm is approximately 5%. (Sludge analysis according to Wiegner). The specific surface of this fraction amounts to 20 000 cm$^2$/g. The deposit volume of "Laist" from green salt clay amounts on average to 2.3 ml/g, the water adsorption capacity approximately 0.85 g. Clay minerals have cation exchange capability, the cations, capable of exchange, and the anions, capable of reaction are located on the surface. With adsorption of water or with installation of hydratized ions, distances between stratified lattice become wider, depending upon structure and active surface. Such ability to swell, although highly varied, is typical for clay minerals. The crystal limit surfaces are thereby negatively charged and there takes place an exchange with ions from the solution surrounding the particles. Chlorite can be dissolved by concentrated hydrochloric acid. The clay substances present an amphoteric character, strong acids destroy the crystal lattice. Silicon and aluminum ions are being dissolved. Silicates and aluminates are being formed. "Laist" has been used for many years in various Austrian sole spas in the form of therapeutic packs for topical treatments, mainly in rheumatic type diseases.

A particularly appropriate method for manufacture of the above mentioned flocculating agents (A) and (B) is characterized in that a salt clay is initially broken down in acid medium at increased temperature, the resulting acid suspension is strongly alkalized, the alkaline suspension kept for some time at increased temperature and the alkaline aqueous flocculating agent separated as clear solution (flocculating agent (A) from the solid flocculating- and sedimentation agent (B)). The particular benefit of said method is therefore that the invention-specific flocculating agents (A) and also (B) are obtained in one single process step by means of simple separation, whereby separation preferably takes place via sedimentation.

The break-down of the salt clay in acid medium will be explained in detail later on. Concentrated technically pure hydrochloric acid is always used for the acid decomposition. Decomposition takes place at increased temperature, especially at a temperature of approximately 50 to 60° C. The resulting acid suspension presents a pH-value of smaller than 1. Subsequently, neutralization takes place with alkali solution, especially with solid sodium hydroxide and a pH-value established of at least 12, especially 12 to 14. The alkaline solution is held for a minimum of two days at increased temperature, especially between approximately 50 to 60° C., preferably 70 to 80° C. Subsequently, the alkaline aqueous flocculating agent is separated as clear solution from the solid flocculating and sedimentation agent. It is preferred that the solid flocculating and sedimentation agent is adjusted to a suspended contents of solid clay substances of approximately 6 to 8% by weight. Observation of these boundaries, which are attained after a settling-down time of two days, especially four days, results in a homogeneous suspension, in which the solid substances (clay substances) will no longer settle down, even after prolonged storage time. To finish, the solution is diluted with water in accordance with application instructions.

The starter materials for this particularly suitable method for the production of the invention-specific flocculating agents (A) and (B) were already explained above in detail, to which reference is made. By way of supplementary comments it should be pointed out that it was determined, after many tests, that insofar as the break-down behavior is concerned, it is the 'Werkslaist' which is attained from green salt clay, which is best suited for producing the flocculating agent (A) and also (B). In principle, other salt clays (and/or the "Laist" from said clays) are also suitable—in particular the other discussed salt clays for production of agents—to improve water quality. However, when using these materials, longer break-down times, higher solution concentrations and break-down temperatures are necessary.

The invention-specific flocculating agents (A) and (B) can be applied with great benefit in a multitude of fields. Thus, the alkaline aqueous flocculation agent (A) can be used especially for treatment of water in swimming pool facilities, either alone or jointly with an aluminum and/or iron-containing flocculating agent—to be dosed in for flocculent filtration, in the treatment of drinking water, industrial water, gray water and waste water as specific flocculating and precipitation means, in the solid matter separation in sewage treatment plants as adsorption and sedimentation and filtration adjuvant and for reduction of noxious substances, also to enhance water in swimming ponds, in (landscape) ponds and biotopes, whereby application of the flocculating agent is done by means of dosing devices. The invention-specific flocculating- and sedimentation agent (B) is especially suited for treatment of pond water, in particular of natural and artificially constructed ponds, biotopes and waters with vigorous plant-growth or algae growth and high water cloudiness, whereby the agent is especially applied to the respective water surface.

Further details concerning particularly beneficial application fields: The active substance which was manufactured according to the invention can be utilized in all fields of water treatment, in particular also in the treatment of drinking water, industrial water, gray water and waste water, or employed as specific flocculating and precipitation means, as well as adsorption- and sedimentation agent, not to forget as filtration adjuvant in the separation of solid matter in sewage treatment plants. In the field of waste water, the agent acts upon easily dissolvable organic compounds, as well as positively charged colloids. In this instance, the means (B) is preferably dosed into the sludge inlet—before the revitalization basin. Means (A) as flocculating adjuvant in the treatment of drinking water supports the employed flocculating means, especially in case of very soft or also untreated alkaline waters. With respect to gray water or water which is recycled for industrial use, this constitutes additional application fields for these substances. In pond maintenance work and in specific applications of water treatment or water processing in Koi (fish) ponds, these substances are proving themselves as excellent means in order to guaranty the necessary water quality for the fish and in order to maintain the required parameters.

Specific product properties: With respect to application for pond water: as dosed-in product there occurs a phosphate reduction (due to phosphate precipitation) with effect of reduction in the growth of algae and reduction of the drawbacks connected with water hygiene as a result of excessive algae growth. In addition, there is a reduction in the $KMnO_4$ consumption of pond water. Flocculation of micro-organisms and organic burdens in difficult to dissolve agglomerates is likewise facilitated. As a result of the mentioned properties, there occurs a reduction in the consumption of oxygen and, consequently, the bio-cycle is supported and improved. The efficacy—and it is here that the product distinguishes itself as particularly beneficial—lies in a pH-range of pH 6 to pH 9.5. (Experience has shown that open air bodies of water in comparison with" adjusted" pH-value in swimming pool water (which may range between 6.5 pH and 7.4 pH) have a higher pH-value, which can also correspond to approved pH-values in drinking water of up to pH 9.5). In case of pH-values above 7.4, flocculation with aluminum salts, for example, is no longer effective or flocculation takes no longer place, so that the water is enriched with dissolved aluminum, which is unwelcome. (For these reasons alone, inorganic flocculating agents based on aluminum are eliminated right from the start).

Iron-containing flocculating agents can be employed in higher pH-ranges, but they do not make any sense with respect to the treatment of pond water due to other properties having to do with flora and fauna. In case of the invention-specific means, these negative properties do not exist with respect to application in natural bodies of water or pond water. The substance also distinguishes itself by being environmentally friendly. The sediments which were produced by flocculation- and precipitation reactions are difficult to dissolve, so that the "bound" materials and noxious matter can no longer "remobilized" under normal circumstances as one would encounter in swimming ponds. Only in the strongly acidic range of pH<3 will the sediments dissolve! By means of phosphate precipitation as well as proper chemical bond and linkage of substances will unwelcome materials be optimally removed from the water or the water cycle. As a result, unwelcome development of algae and putrefaction in the water is more effectively prevented. The water is pure and clear and has low organic burden. The use of agent (D) as sedimentation means in case of so-called "turned" water has the effect that the suspended and cloudiness-producing materials are rapidly bound and they settle down. They can be removed from the bottom of the basin without any problem via suction method. Even after some lengthy stay of the bound materials one cannot see any "remobilization". The problems affecting the pond water quality and optics connected with remobilization do not appear. These substances are also extremely suitable for application in small biotopes which do not lend themselves for swimming. They promote the bio-cycle and water beautification. It is well known that unwelcome cloudiness frequently affects these small biotopes, which is caused by the metabolism of the algae. This can be prevented by periodic treatment of the pond water. The invention-specific means is not a harmful substance. Inasmuch as micro-organisms can also be flocculated, the product has significant importance regarding the micro-biological conditions in the pond water, caused by flocculation of bacteria, even though the product is not a disinfectant, which cannot be employed in natural bodies of water. Since the raw materials of the product are natural materials or minerals (primeval ocean substances) from hazel agglomerate, there is no contradiction insofar as conceptions of the "bio-pond builders" and pond owners are concerned of not wanting to use any classical chemicals.

In case of flock-filtration in swimming pools using an aluminum and/or iron-containing flocculating agent, the following dose of the invention-specific means is added per $m^3$ of circulated water: 0.6-1.0 ml. Depending upon the amount of impurities in a swimming pond, 2 to 4 $ml/m^3$ of circulated water are dosed in by means of suitable dosing technology. If employed as sedimentation agent, following an initial dose of 60 $ml/m^3$ pond water (prior to the growth phase) –30 $ml/m^3$ of pond water is sprayed over the surface of the pond at periodic intervals of about 4 weeks (time frame May-August). At the end of the season, as final dose—preferably in September—once again 30 $ml/m^3$ of pond water. As sedimentation agent in case of already "turned" algae-ridden pond water, the product is applied in somewhat modified form with additional solid matter contents (clay minerals) of 60 to 100 $ml/m^3$ of pond water.

In the following, the invention is going to be explained in more detail based on examples, manufacturing examples and also examples concerning effectiveness tests:

EXAMPLE 1

(Manufacture of the Flocculating Agent (A)):

Set-up of 100 liter concentrate: The "Werkslaist" is taken from a sink-system, in which crude brine is obtained from hazel agglomerate mixed with green salt clay. In order to remove coarse-grained, mostly carbonized inclusions, 7.5 kg of the pit-moist "Laist" are reduced to sludge in 20 liters water and pressed through a screen with 2 mm mesh width. The filtrate (suspension) is transferred into an acid-resistant and alkali-fast, heatable decomposition tank, mixed with 20 kg of concentrated hydrochloric acid and stirred for 2 days at 50° C. (decomposition of chlorite). Under addition of 20 liters of water, slowly and while measuring the pH-value, 28 kg of sodium hydroxide (NaOH) are dosed in. When the sodium hydroxide is dosed in, magnesium hydroxide is precipitated, which occurs in highly voluminous form with rapid rise of the pH-value. In order to obtain precipitation which settles down more easily, it is useful to interrupt the addition of sodium hydroxide for 2 hours after attaining a pH-value of 8. After that time, the remaining sodium hydroxide is dosed in. Subsequently, the suspension is filled up to 100 l and stirred for five days at 80 to 90° C. After that time period, the contents of silicon and aluminum is analytically ascertained as index substance.

As index substance, the filtered solution contains 15-17 g/l $SiO_2$ and 6-7 g/l $Al(OH)_3$. After cooling down, the suspension is transferred to an adjustment tank, and, following an addition of 65 liters of pure brine (increase of NaCl-contents) and water it is diluted to 1000 l. The stirring mechanism is switched off after a mixing time of approximately 2 hours. After sedimentation time of approximately two days, the now crystal-clear solution (A) is ready to use and can be filled into appropriate barrels or kegs and employed as flocculating adjuvant for the treatment of swimming pool water.

EXAMPLE 2

(Manufacture of Flocculating Agent (B)):

In the described decomposition process, approximately half of the employed "Laist" is dissolved. The remainder collects at the bottom of the vessel as suspension with 6 to 8% of solid matter, which consists of extremely fine-grained clay particles. As indicated by the sludge analysis, the portion of particles smaller than 2 μm is approximately 5% before the decomposition process, after decomposition it is greater than 30%, which is concomitant with a corresponding increase in the specific surface. After filling into appropriate barrels or kegs, the product gets to the user as suspension of approximately 6-8%, and after appropriate dilution according to application instruction, is used for the treatment of pond water.

EXAMPLE 3

(Effectiveness Test):

If the density difference between the liquid phase and the solid phase has reached a minimum, the particles remain in suspension. The solid materials do not settle down and do not cause any clouding of the water. The sinking velocity also depends upon the shape of the particles, which may be spherical, dice-like or platelet-like. Due to the special surface properties of the salt clay particles there takes place an agglomeration and adsorptive bonding of turbidities and, consequently, resulting in more rapid sinking of the impurities. Following the introduction of salt clay particles, there is a distinct change in the sedimentation and filtration behavior, which is attributable to a change in structure or a valence change at the limit surface and thus a change in the particle charge conditions. Because of the adsorptive properties of the salt clay particles, noxious substances are also removed, and/or substances which are needed for the growth of algae are clearly reduced.

This includes, for example, phosphate, which can provide, when the sun is shining, optimal conditions for photosynthesis of algae, leading to massive growth and the therewith connected problems.

Proof:
Measurement of water cloudiness before and after addition of flocculating agent (A)
Analysis of PO4—contents before and after addition of flocculating agent (A)
Analysis of KMnO4 consumption before and after addition of flocculating agent (A).

| | |
|---|---|
| Visual depth of water prior to treatment | 1.5-2 m |
| 7 days after two time treatment with flocculating agent (A) | 4 m |
| Total phosphate prior to treatment of water | 42.3 μg/l |
| 1 day after treatment with flocculating agent (A) | 23.3 μg/l |
| 11 days after treatment with flocculating agent (A) | 14.3 μg/l |
| Consumption of potassium permanganate | |
| before treatment of water | 26.0 mg/l |
| 1 day after treatment with flocculating agent (A) | 24.0 mg/l |
| 11 days after treatment with flocculating agent (A) | 17.7 mg/l |

Tests in the laboratory and in actual practice have shown that nitrate contents could also be reduced by at least ⅓, in some cases even more. These tests clearly confirmed that harmful plant growth in water, caused by phosphates and nitrates, can be greatly diminished. Unwelcome growth of algae and in part also excessive plant growth, can thus be effectively counter-acted.

EXAMPLE 4

(Manufacture of Flocculating Agent (A) and (B)):

The method for manufacture of the swimming pool flocculating agent (A) and the pond water beautification agent (B) can be specifically characterized by the following process measures:
  utilization of "Werkslaist"—preferably of "Werkslaist" which came from green salt clay!
  reduction to sludge of the "Laist" at a ratio of 2.66 parts water:1 part "Laist" and separation of coarse particles>2 mm.
  decomposition of chlorite portion by addition of conc. hydrochloric acid at a ratio of 1 part "Laist"-suspension by weight:0.75 parts by weight of conc. HCl.
  at a temperature of 50° C., the mixture is stirred
  Addition of sodium hydroxide at a ratio of 1 part by weight of mixture:0.6 parts by weight of sodium hydroxide
  5 days stirring at 80-90° C.
  Contents of solution 15-17 g/l SiO2 and 6-7 g/l Al(OH)3
  after cooling solution, it is preferably mixed with pure brine at a weight ratio of 1:1 (pure brine density 1.2 kg/l, 300 g/l NaCl) or a corresponding amount of alkali chloride is added.
  After sedimentation of the remaining solid matter, the clear concentrate is drawn off and mixed in the dilution tank with water at a weight ratio of 5.6 parts water to 1 part concentrate.
  Solution (A) is now ready for use and is added to the swimming pool water in accordance with the indicated dosing instructions as an adjuvant for improvement of flocculent-/flocculating filtration.
  Concentrate (A) can, however, also be shipped directly and diluted on site with water in accordance with application instructions.
  After settlement there remains a suspension which contains approximately 6-8% solid matter, which consists of various very fine-grained and reactive clay minerals. According to the application instructions, this product is used for beautification and improvement of water quality in bathing ponds and biotopes.

The flocculating agent (A) is dosed in with a dosing device by means of appropriate filtration technique.

Flocculating agent (A) as well as flocculating agent (B) can be sprayed over the pond surface in order to obtain sedimentation (settling) of the coagulated, adsorbed and precipitated substances. The flocculating agent (A) for treatment of swimming pool water is dosed in together with an aluminum- and/or iron-containing flocculating agent (flocculation- and flocculating agent) for flocculent filtration.

The invention claimed is:
1. A method for manufacture of an alkaline aqueous flocculating agent and a solid flocculating agent and sedimentation agent comprising the following steps:
  a salt clay is initially broken down in an acid medium at increased temperature of at least 50° C., resulting in an acid suspension of a pH-value of less than 1;

the resulting acid suspension is adjusted to establish a pH of at least 11;

the alkaline suspension kept for a minimum of 2 days at increased temperature of at least 70° C.; and the alkaline aqueous flocculation agent is separated as clear solution from the solid flocculation and sedimentation agent.

2. A method according to claim 1, wherein the resulting acid suspension is adjusted to a pH-value of at least 12.

3. A method according to claim 1, wherein the resulting acid suspension is adjusted to a pH-value of 12-14.

4. A method according to claim 1, wherein the acid medium is kept at an increased temperature of 50-60° C.

5. A method according to claim 1, wherein the alkaline suspension is kept at an increased temperature of 70-80° C.

6. A method according to claim 1, wherein the separation is by means of sedimentation.

7. A method according to claim 1, wherein grey salt clay, green salt clay, red salt clay and/or black salt clay, is used as starting material.

8. A method according to claim 1, wherein the solid flocculation and sedimentation agent and the alkaline aqueous flocculation agent are used for the treatment and renovation of water and waste water.

9. A method according to claim 8, wherein the suspension of the flocculation and sedimentation agent is adjusted to a suspended content of approximately 6 to 8% by weight.

10. An alkaline aqueous flocculating agent based on an alkali aqueous salt clay extract with a contents of dissolved silicates and aluminates as well as alkali chloride, obtained by the method of claim 1, whereby for 1 part by weight of aluminates expressed as $Al(OH)_3$ are provided;

1) 2 to 3 parts by weight of silicate (expressed as $SiO_2$) as well as 2) at least 10 parts by weight alkali chloride.

11. An alkaline aqueous flocculation agent according to claim 10, wherein for 1 part by weight of aluminates expressed as $Al(OH)_3$ are provided at least 20 parts by weight of alkali chloride.

12. An alkaline flocculating agent according to claim 10, wherein the alkali chloride exist in form of sodium chloride.

13. An alkaline flocculating agent according to claim 10, wherein for 1 part by weight of aluminates are provided at least approximately 30 parts by weight of alkali chloride.

14. An alkaline flocculating agent according to claim 10, wherein the pH-value lies above 12.

15. An alkaline flocculating agent according to claim 10, wherein the pH-value the flocculating agent lies between approximately 12 and 14.

16. An alkaline flocculating agent according to claim 10, wherein said flocculation agent is a clear, colorless, odorless and non-toxic solution.

17. A solid flocculation and sedimentation agent in the form of an acidic and alkali extracted salt clay having an average particle size smaller than 50 μm and obtained by a method according to claim 1.

18. A method for manufacture of an alkaline aqueous flocculating agent and a solid flocculating agent and sedimentation agent comprising the following steps:

a salt clay is initially broken down in an acid medium at an increased temperature of 50-60° C., resulting in an acid suspension of a pH-value of less than 1;

the resulting acid suspension is adjusted to establish a pH of at least 11;

the alkaline suspension kept for a minimum of 2 days at an increased temperature of 70-80° C.; and the alkaline aqueous flocculation agent is separated as clear solution from the solid flocculation and sedimentation agent.

* * * * *